United States Patent
Newhouse et al.

[11] Patent Number: 6,133,204
[45] Date of Patent: Oct. 17, 2000

[54] USE OF OIL-BASED GEL-BREAKER/ INHIBITOR COMPOUNDS WITH POLYMER GELS IN WELL TREATMENTS

[75] Inventors: Daniel P. Newhouse, Spring, Tex.; Quintin J. Lai, Anchorage, Ak.

[73] Assignee: Atlantic Richfield Company, Chicago, Ill.

[21] Appl. No.: 09/246,975

[22] Filed: Feb. 9, 1999

[51] Int. Cl.[7] .............................. C09K 3/00; E21B 33/13
[52] U.S. Cl. ........................ 507/267; 507/266; 507/903; 507/921; 166/295; 523/130
[58] Field of Search .................... 507/267, 266, 507/921, 903; 166/295; 523/130

[56] References Cited

U.S. PATENT DOCUMENTS

| | | | |
|---|---|---|---|
| 1,689,902 | 10/1928 | Williams | 507/267 |
| 2,106,242 | 1/1938 | De Groote | 507/267 |
| 2,842,205 | 7/1958 | Allen et al. | 166/21 |
| 2,968,572 | 1/1961 | Peeler | 106/74 |
| 3,306,756 | 2/1967 | Miller | 106/84 |
| 3,306,758 | 2/1967 | Miller | 106/84 |
| 3,449,139 | 6/1969 | Kuhn | 106/84 |
| 3,990,978 | 11/1976 | Hill | 507/267 |
| 4,293,340 | 10/1981 | Metz | 106/74 |
| 4,354,874 | 10/1982 | Vickers | 106/74 |
| 4,354,875 | 10/1982 | Powers et al. | 106/74 |
| 4,384,894 | 5/1983 | Vickers et al. | 106/80 |
| 4,683,949 | 8/1987 | Sydansk et al. | 166/270 |
| 4,706,754 | 11/1987 | Smith | 166/295 |
| 4,724,906 | 2/1988 | Sydansk | 166/295 |
| 4,730,675 | 3/1988 | Wygant et al. | 166/295 |
| 4,770,245 | 9/1988 | Sydansk | 166/295 |
| 4,968,442 | 11/1990 | Falk | 252/8.551 |
| 4,986,356 | 1/1991 | Lockhart et al. | 507/267 |
| 5,002,431 | 3/1991 | Heymans et al. | 405/128 |
| 5,010,954 | 4/1991 | Falk | 166/295 |
| 5,048,609 | 9/1991 | Tackett, Jr. et al. | 166/295 |
| 5,082,057 | 1/1992 | Sydansk | 166/295 |
| 5,314,019 | 5/1994 | Honarpour | 166/270 |
| 5,338,465 | 8/1994 | Lockhart et al. | 252/8.551 |
| 5,404,951 | 4/1995 | Lai et al. | 166/295 |
| 5,421,411 | 6/1995 | Sydansk | 166/295 |
| 5,478,802 | 12/1995 | Moradi-Araghi | 507/267 |
| 5,609,208 | 3/1997 | Sydansk | 166/295 |

OTHER PUBLICATIONS

SPE/DOE 17329 "A New Conformance–Improvement–Treatment Chromium (III) Gel Technology", by R. D. Sydansk; Society of Petroleum Engineers, Inc./U.S. Department of Energy, Apr. 20, 1998.

*Primary Examiner*—Philip Tucker
*Attorney, Agent, or Firm*—F. Lindsey Scott; Robert E. Sloat

[57] ABSTRACT

A gel-breaking/gel-inhibiting composition containing at least one carboxylic acid or salt thereof is dispersed in a hydrophobic carrier fluid to break down a cross-linked polymer gel or inhibit the gelation of a polymer gel used in plugging in permeable subterranean formations containing oil-bearing zones and water-bearing zones. The composition may be used to selectively restore permeability to oil-bearing zones in formations containing a cross-linked polymer gel or to inhibit gelation in an oil-bearing zone by injection into the oil-bearing zone prior to or after treatment of the formation containing the oil-bearing zone with an aqueous polymer solution.

11 Claims, 3 Drawing Sheets

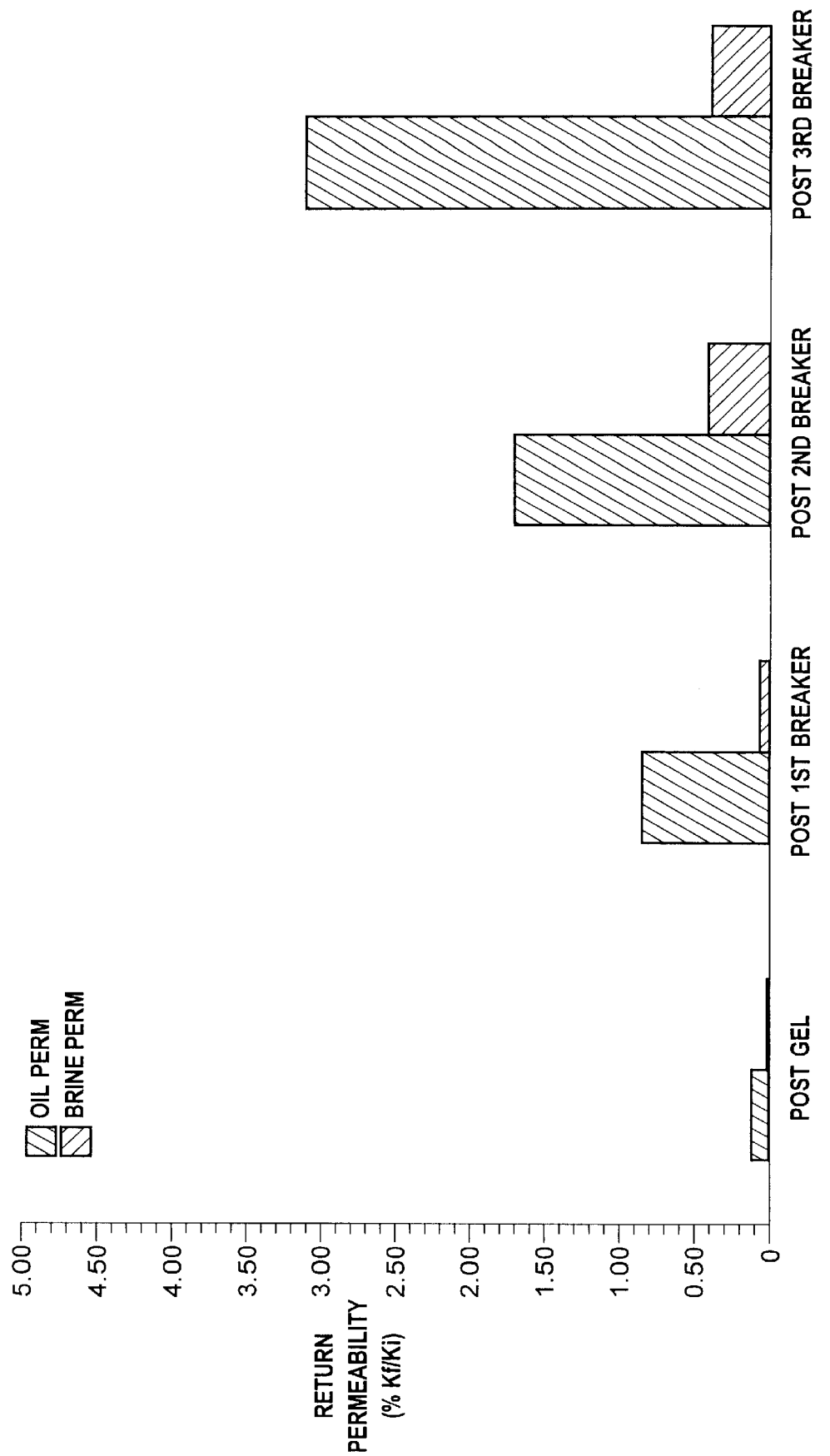

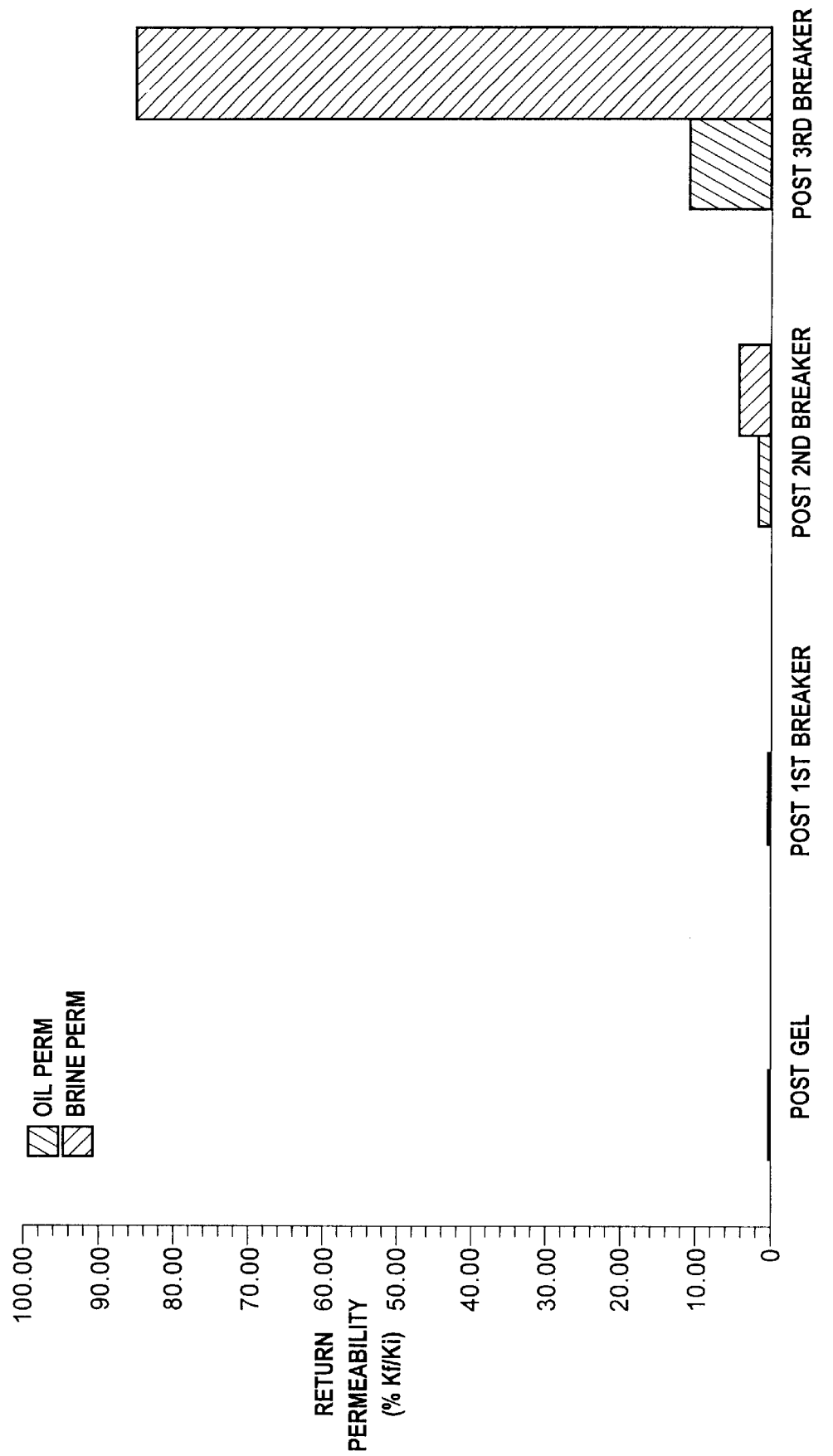

USE OF OIL-BASED GEL-BREAKER/INHIBITOR COMPOUNDS WITH POLYMER GELS IN WELL TREATMENTS

BACKGROUND OF THE INVENTION

1. Field of the Invention

This invention relates to methods of treating permeable subterranean formations in oil and gas wells using polymer gels to reduce the formation permeability, and more particularly to a method of treating such formations with such polymer gels to selectively reduce the permeability in certain regions while maintaining the permeability in others.

2. Description of the Prior Art

In oil and gas wells, it is sometimes desirable to block or reduce the permeability of certain zones or regions of the subterranean formation surrounding the well. For example, water from water-bearing zones can interfere with oil or gas recovery operations. The production of water from these zones reduces the amount of hydrocarbons that can be recovered from the well and may require additional separation and disposal procedures if the water is removed from the well along with the oil and gas. Thus, it is beneficial to block off these water-bearing regions so that the desired oil or gas can be recovered more effectively. In other instances, such as in injection wells, it may be desirable to block off certain zones to plug high-fluid-loss zones or layers, change fluid injection profiles and the like.

Polymer gels formed from hydrophilic polymers, such as polyacrylamides, have been used in the past to reduce the permeability of selected zones within subterranean formations in oil and gas wells as disclosed in U.S. Pat. No. 5,338,465, issued Aug. 16, 1994 to Thomas P. Lockhart. This patent is hereby incorporated in its entirety by reference. These polymers are usually mixed with water at the surface to produce aqueous solutions of gellable polymers that are pumped into the formation. A cross-linking agent is typically added to the solution at the surface, along with any delaying agents or gel inhibitors, so that once the solution is in place within the desired region of the formation, the polymer begins to gel or cross-link so that the polymer gels in place and plugs the pore channels and flow paths of the formation and the permeability of the formation is effectively reduced or blocked. In this way, the water-bearing zones or high-fluid-loss zones and the like, as discussed previously, can be plugged or blocked.

One of the problems encountered in treating formations with these polymer gels is that the treatments are relatively non-selective and can result in blocking or plugging zones, such as hydrocarbon-bearing zones, where it is desirable to maintain permeability. In many cases, the production of all fluids from the formation is stopped. One method of repairing such damaged areas is to re-perforate the damaged zone (typically the hydrocarbon-bearing zone or layer). If the gel penetration is too deep to perforate past the gel damage, the well may have to be abandoned, sidetracked to bypass the damaged zone or the like. Such procedures are both time consuming and costly.

Another method of restoring the damaged area is to inject gel-breaker materials into the gel-filled zones to break the gel. These methods are substantially less costly. The gel breaker can usually be placed within the damaged zone through coiled tubing, through the production tubing of the well or the like. The prior art gel breaker systems are water-based and usually consist of a chelating agent dissolved in an aqueous solution. Because such gel breakers are water-based, they have an affinity for the water-bearing zones of the formation. The injected gel breaker thus has a tendency to penetrate the water-bearing zones, breaking down the gel within these zones so that there is an increase in water production which may exceed the desired increase in hydrocarbon production. The quantity of the aqueous gel-breaking solution necessary to ensure that the gel within the hydrocarbon-bearing zones is effectively broken down may result in an undesirable removal of the gel from the water-bearing formations with a resulting restoration of a substantial portion of the initial water production.

What is therefore needed is an effective and reliable means of treating a subterranean formation in an oil or gas well with polymer gels to plug or block water-producing zones, while hydrocarbon-bearing zones of the formation remain open so that oil and gas can be recovered more effectively, or a method for selectively removing gels from hydrocarbon-bearing formations.

SUMMARY OF THE INVENTION

The present invention comprises a gel-inhibiting/breaking composition for use with polymer gels in the treatment of permeable subterranean formations in oil or gas wells. The gel-inhibiting composition may be used in formations having both permeable water-bearing zones and permeable hydrocarbon-bearing zones. The gel-inhibiting composition has a greater affinity for the hydrocarbon-bearing zones than for the water-bearing zones so that the gel-inhibiting composition preferentially enters the hydrocarbon-bearing zones. The gel-inhibiting composition comprises at least one carboxylic acid or salt thereof dissolved or dispersed in an alcohol/oil solution.

The present invention further comprises a method for selectively treating a subterranean formation penetrated by at least one wellbore wherein the formation includes both permeable water-bearing and permeable hydrocarbon-bearing zones by injecting a polymer solution into both the water-bearing and hydrocarbon-bearing zones and allowing the polymer solution to gel, injecting the composition and selectively restoring permeability in the hydrocarbon-bearing zones.

The present invention further comprises a method for selectively treating a subterranean formation penetrated by at least one wellbore wherein the formation includes both permeable water-bearing zones and permeable hydrocarbon-bearing zones by injecting a quantity of the composition into the formation; injecting a gellable polymer solution into the formation; allowing gellable polymer solution to gel in the water-bearing zones so that the permeability of the water-bearing formations is reduced, while the composition in the hydrocarbon-bearing zones contacts and inhibits the gelation of the gellable polymer solution in the hydrocarbon-bearing zones so that the hydrocarbon-bearing zones remain permeable.

The present invention further comprises a method for treating a subterranean formation including both permeable water-bearing zones and permeable hydrocarbon-bearing zones; by injecting a gellable polymer solution into both the water-bearing and hydrocarbon-bearing zones of the formation; injecting a quantity of the composition into the formation, allowing gellable polymer solution to gel in the water-bearing zones so that the permeability of the water-bearing formations is reduced, while the gel-inhibiting material in the hydrocarbon-bearing zones contacts and inhibits the gelation of the gellable polymer solution in the hydrocarbon-bearing zones so that the hydrocarbon-bearing zones remain permeable.

The composition may be injected both prior to and after the injection of the gellable polymer solution.

BRIEF DESCRIPTION OF THE DRAWINGS

FIGS. 2 and 3 are bar graphs showing the test results described in the Example.

DESCRIPTION OF THE PREFERRED EMBODIMENT

Figure 1:
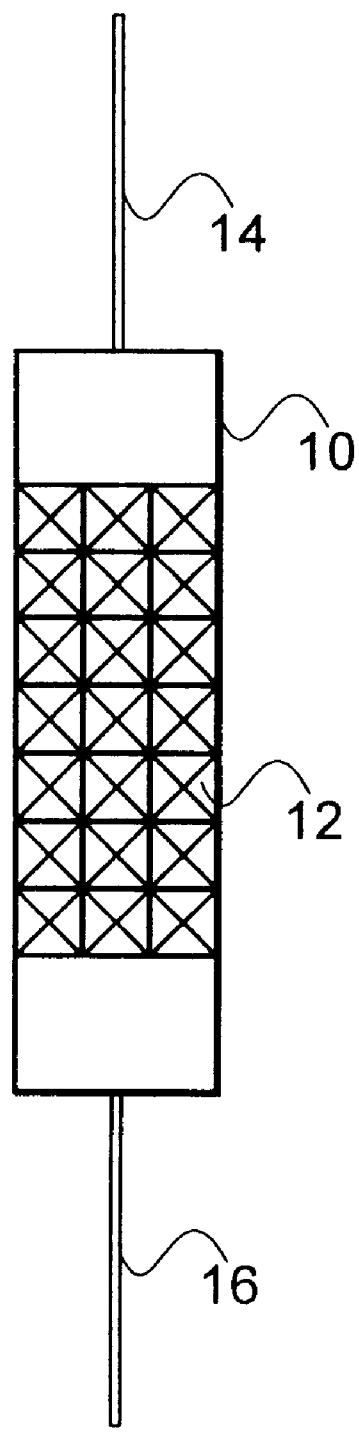
FIG. 1 is a schematic of the flow apparatus used for the tests described in the Example.

Unless otherwise stated all references to percentages (%) herein refer to weight percent.

The polymers used in well treatments for blocking or plugging permeable formations to reduce or retard fluid production are hydrophilic polymers that generally hydrate in water and are capable of being cross-linked in solution so that the polymers are interconnected with one another to form a gel. For convenience, mixtures of these polymers and water are referred to herein as solutions. Examples of these polymers are well known to those skilled in the art and include polyacrylamide and partially hydrolyzed polyacrylamide polymers, the polymers and copolymers of acrylic acid and acrylamide, polymethacrylamides and partially hydrolyzed polymethacrylamides, sulfonated acrylamide polymers, polyvinyl polymers, such as polyvinyl alcohol, polyvinyl acetate, and polyvinyl pyrrolidone, the polyalkylenoxides, and the ammonia salts and alkali metal salts thereof. Other suitable polymers are the polysaccharides, the cellulose ethers, such as ethyl cellulose and methyl cellulose, carboxyalkylcellulose, such as carboxymethylcellulose and carboxyethylcellulose, and substituted and unsubstituted galactomannans, including guar gum.

The polymers are combined with a cross-linking agent to attach the polymers to form a cross-inked polymer gel. Various cross-linking systems can be employed in the present invention and are well known to those skilled in the art. In the present invention, the preferred cross-linking agents are inorganic. Examples of suitable inorganic cross-linking agents include the salts or complexes of the multi-valent metals such as chromium, zirconium, titanium and aluminum. Tri-valent metallic ions, such as chromium and aluminum, act as particularly good cross-linkers and are frequently added as chromium acetate, chromium citrate, chromium carboxylate, chromium chloride, and aluminum citrate. These metallic cross-linkers bond ionically with the polymers to form the cross-linked molecule. Other suitable cross-linking agents may be used in forming the polymer gels of the invention, and are well known and will be readily apparent to those skilled in the art. The amount of cross-linker used will typically vary depending upon the type of polymer, the cross-linking agent being used, and the degree of cross-linking desired. Delaying agents and other additives may also be used with the polymer gels.

In treating subterranean formations in oil and gas wells, the polymer solution and cross-linking agent are usually combined at the surface and then pumped or injected into the well under pressure so that the solution is allowed to penetrate the surrounding formation and eventually gel or cross-link. In oil and gas wells, it is generally the water- or aqueous-fluid-bearing zones of the formation that are preferentially treated with the polymer gels so that these zones are effectively blocked, while the hydrocarbon-bearing zones are left permeable so that the desired oil or gas can be recovered.

According to the present invention a gel inhibiting/breaking composition is provided for selectively inhibiting the gelation of polymer solutions in hydrocarbon-bearing zones of a formation and for selectively removing polymer gels from hydrocarbon-bearing zones of a formation. The composition contains at least one gel inhibitor/gel breaker material selected from the group consisting of the carboxylic acids containing from about 1 to about 16 carbon atoms and salts thereof dispersed in an alcohol/oil solution. Preferable carboxylic acids are those containing from 1 to about 4 carbon atoms. Some preferred carboxylic acids are malic acid, maleic acid, malonic acid, citric acid, acetic acid, lactic acid, proprionic acid and salts thereof. Preferred salts are the monovalent alkali metal salts, of these sodium and potassium are preferred. Ammonia salts may also be used. The gel inhibitor/gel-breaker material functions to inhibit gellation when present in an immature or ungelled polymer solution (gel inhibitor) and also functions to break down polymer gels when positioned in contact with the polymer gels (gel breaker).

Because the gel inhibitor/breaker materials used in the present invention are not readily dispersed in oils, they usually must be dissolved in a solvent that is readily miscible with the oil. Suitable solvents for this purpose include alcohols containing from 1 to about 20 carbon atoms. The gel inhibitor/gel-breaker materials are soluble in these alcohols, and the resulting alcohol solutions can be readily dispersed in oil. The alcohols are used in quantities sufficient to dissolve the gel breaker/inhibitor material and to maintain it in a single-phase dispersion or solution with the oil. Typically, the alcohol or mixture of alcohols will be present in the composition in an amount equal to from about 5 to about 95% of the composition, preferably from about 25 to about 75% of the composition and more preferably from about 35 to about 55% of the composition. Suitable alcohols include methanol, ethanol, 1-propanol, isopropanol, 1-butanol, 2-butanol, isobutyl alcohol and tert-butyl alcohol. The gel inhibitor/breaker material is dissolved in the alcohol at a selected concentration to provide a gel-inhibitor/breaker material concentration in the composition ranging from about 0.01 to about 30%, with a range of about 1 to about 20% being preferred, and a range of about 2 to about 10% being more preferred. The gel inhibitor/breaker material-alcohol solution is then mixed with the oil in an amount ranging from about 5 to about 95% of the composition, with the oil making up about 5 to about 95% of the composition. Preferably the gel inhibitor/breaker material-alcohol solution is dispersed in the oil in an amount ranging from about 25 to about 95% of the composition, and still more preferably within the range of from about 35 to about 55%.

In the present invention, a quantity of the composition is added in a separate stage or stages, either prior to, subsequent to, or both prior to and subsequent to the injection of the polymer solution into the formation. The composition selectively enters the hydrocarbon-bearing zones of the formation and the gel-inhibiting agent acts as a chelating agent or coordination compound that interacts with the polymer cross linker to prevent subsequent cross linking of the polymer to form a polymer gel.

By selectively introducing and positioning the composition in the hydrocarbon bearing zones of the formation in sufficient quantities, prior to gellation of the polymers, the formation of polymer gels within the hydrocarbon-bearing zones can be prevented so that the hydrocarbon-bearing zones are not plugged or damaged. It is important in such treatments that the water-bearing zones remain relatively free of the gel inhibitor so that the polymer solutions will readily gel within these areas. As discussed previously, in prior art gel-breaking systems, the gel breaker is water based or dispersed within an aqueous solution. These solutions therefore have a tendency to penetrate both zones because of resistance to aqueous flow. This is the opposite effect from what is desired.

In the present invention, the penetration of the composition into the water-bearing zones is inhibited while there is enhanced penetration of the gel inhibitor/breaker into the hydrocarbon-bearing zones. This is accomplished by dispersing the gel inhibitor/breaker materials in a hydrophobic carrier fluid (oil). The carrier fluid is preferably a pumpable, non-polar hydrocarbon oil or other non-polar liquid. Because the hydrophobic carrier fluid has a greater affinity for the hydrocarbon-bearing zones of the formation and has very little affinity for the water-bearing zones, it will tend to penetrate these areas more readily, with little penetration into the water-bearing zones. Examples of suitable hydrophobic carrier fluids (oils) in the composition include diesel oil, crude oil, kerosene, jet fuel, white mineral oil, lubricating oil, toluene, xylene, silicon oils, mutual solvents and the like. Mutual solvents such as ethyleneglycolmonobutylether are sometimes useful to enhance the miscibility of the materials.

The gel composition can be used either as a pretreatment prior to the introduction of the polymer solution, as a post treatment, or both. In pretreating the formation, the gel inhibitor is dispersed within the oil-based carrier fluid utilizing the alcohol solvent as discussed above and is injected into the formation to be treated with the polymer gel. The concentrations of gel inhibitor/breaker materials may be lower than when the composition is used as a gel breaker. Concentrations as low as 100 ppmw are suitable. The amount of gel inhibitor used will depend upon the type of formation being treated, the depth of penetration desired, the amount of polymer solution, and the amount of cross linker being used. When the gel inhibitor of the invention is injected into the formation, it will tend to penetrate the oil or hydrocarbon-bearing zones due to the affinity of the carrier fluid for these zones. In contrast, there is little affinity of the carrier fluid for the water-bearing zones, and accordingly there will be less penetration by the carrier fluid into the water-bearing zones, and only a minor amount of the gel inhibitor will be positioned in the water-producing zones. When the polymer gel solution is introduced into the formation, the gel-inhibiting material is present in sufficient quantities in the hydrocarbon-bearing zones to inhibit the cross linking or gelation of the polymer solution so that there is little or no gel formation in these zones and these areas remain permeable and are not blocked or plugged by the polymer gel. Because the gel inhibitor does not readily penetrate the water-producing zones, the polymer solutions will penetrate these areas and readily gel or cross-link so that the water-producing zones are effectively plugged. When the well is brought into production, the ungelled polymer within the hydrocarbon-bearing zones are removed from the formation along with the desired oil or gas.

The composition can also be used as a post flush after the polymer solution is introduced into the formation. In these situations, the composition is injected into the formation after injection of the polymer solution, but before the polymer has gelled. Because of the carrier fluid's affinity for the hydrocarbon-bearing zones, the gel inhibitor tends to preferentially penetrate the channels and pores of the formation within the hydrocarbon-bearing zones to break down any gelled polymer and inhibit further gelation of the polymer solution so that these areas remain unplugged. The water-bearing zones, however, will remain plugged due to the lack of penetration by the carrier fluid into these areas. The post flush can also be used in conjunction with a pretreatment or preflush of the gel inhibitor system of the invention, as described previously, to further ensure that there is minimal plugging in the hydrocarbon-bearing zones.

In another aspect of the invention, the composition may be used as a gel breaker system to break down polymer gels within the hydrocarbon-bearing zones of the formation. In such treatments it is desirable that only the gel in the hydrocarbon-bearing zone be broken with little or no affect on the gel in the water-bearing zones. The gel breaker may also be used in conjunction with the pre- and post-flush treatments discussed above.

In utilizing the gel-breaker composition of the invention, it may be preferable to bring the well into production for a period of time after the polymer solution has been injected into the formation and sufficient time has elapsed for the polymer to gel prior to injection of the composition to break the gel. In this way, any ungelled polymer can be removed from the formation when the well is brought back into production. The flow of hydrocarbons from the hydrocarbon-bearing zones will also remove or decrease residual water left from the polymer solution within the hydrocarbon zones that could otherwise inhibit the penetration of the composition into these zones. Production is then halted, and the composition is injected into the formation. Because the carrier fluid is hydrophobic in nature, it will tend to follow oil passageways and penetrate and carry the gel breaker into the hydrocarbon-bearing zones, while there is little penetration of the gel breaker into the water-bearing zones. After a sufficient time has elapsed to allow the gel to break, the well can be brought slowly back on production to remove the broken gel.

The composition is injected into the formation when used as a pre-treatment or a post-treatment in a quantity from about 0.01 to about 90% of the gel treatment volume. Generally, the quantities injected are selected to position a sufficient quantity of gel inhibitor in the areas of the formation to neutralize the quantities of cross-linker material which is present in the quantities of aqueous polymer solution anticipated to enter the hydrocarbon-bearing areas or which have been injected prior to a post flush.

When used as a polymer breaker, the composition is injected in a volume sufficient to react with a sufficient quantity of the cross-linking ions in the polymer gel in the hydrocarbon-bearing areas to reduce the viscosity of the gel to a viscosity at which the polymer gel components can be produced with the oil or gas from the hydrocarbon-bearing zones. Typically, the volumes are equal to from about 1 to about 500% of the pore volume in the hydrocarbon-bearing zone.

The gel-inhibiting and gel-breaking composition and the method of the invention have many advantages. Damage to subterranean formations by polymer gels can be both prevented or repaired in a reliable and effective manner. In preventing formation damage, the gel-inhibiting composition of the invention can be used in conjunction with aqueous polymer solutions as a preflush, postflush, or both, to prevent the formation of the polymer gel within oil-bearing zones. By injecting the gel inhibitor contained in the composition, the gel inhibitor is preferentially positioned in the oil-bearing or hydrocarbon-bearing zones. The aqueous polymer solution injected into these areas of the formation is at least partially prevented from gelling by the presence of the gel inhibitor in the oil-bearing zones. Additionally, the gel inhibitor in the composition has little affinity for the water-bearing zones so that little of the gel inhibitor penetrates these zones. Thus, the polymer solution is able to gel and effectively block or plug the water-bearing zones to reduce water flow, while damage to the hydrocarbon-bearing zones is prevented.

In repairing areas of the formation damaged by polymer gels, the greater affinity of the composition for the hydrocarbon-bearing zones causes the gel breaker to preferentially penetrate the hydrocarbon-bearing areas so that the gel in these zones is broken down. This allows the use of smaller quantities of the composition in comparison to prior art aqueous gel-breaking systems. This reduces both chemical costs and treatment times.

EXAMPLE

Tests were conducted using the apparatus shown in FIG. 1. The apparatus comprises a core holder 10 which is designed to sealingly contain a Berea sandstone core so that flow through the holder 10 must occur through the Berea sandstone core. The holder is adapted for the injection or recovery of fluid at varied pressures through a line 14 and for the recovery or injection of fluid at varied pressures through a line 16.

Initially, the permeability of the Berea sandstone core was determined by saturating the core with brine (2 percent aqueous KCl) and thereafter injecting oil to determine the oil permeability of the core at residual water saturation. This is referred to as the initial oil permeability. The core was then saturated with oil and thereafter brine was passed through the core to determine the initial water permeability of the core at residual oil conditions.

The core was then treated with four pore volumes of a five percent aqueous (5% ALLIED COLLOIDS 254S--a 250,000 average molecular weight polyacrylamide) polyacrylamide polymer solution. A trivalent chromium ion cross-linker supplied in the form of chromium triacetate was added to the solution. The aqueous polymer solution was allowed to gel in the core to form a hard ringing gel.

The oil permeability and the water permeability of the core containing the ringing gel were determined and are shown as the post-gel percent return permeabilities in FIG. 2.

A breaker composition containing 4.5% citric acid, 20.5% Isopropyl alcohol, and 70% arctic diesel was then placed in contact with the gelled core in a quantity equal to 25 volume percent based upon the volume of the gel in the pore spaces in the core and maintained in contact with the core via line 16 at an initial pressure of 375 psia and at a temperature of 200° F. for 24 hours. After this first breaker treatment, the core permeabilities to oil and brine were measured and calculated and the resulting percent return permeabilities are shown in FIG. 2.

A second quantity of the breaker composition was used in a similar fashion and the return permeabilities were thereafter calculated as above. The results are shown as post 2nd breaker in FIG. 2.

A third quantity of the breaker composition equal to 0.50 pore volumes was used for a third treatment and the test results were determined and are shown as the post 3rd breaker data in FIG. 2. In all cases the breaker solution was brought into contact with the core from the bottom via line 16 and the permeabilities were measured in all cases by injecting oil or water at the top of the core via line 14.

As shown clearly in FIG. 2, the increase in return permeability recovery for oil is greatly in excess of the return permeability for brine.

Similar tests were run using an aqueous gel breaker solution containing 5% hexamethylenediaminetetra (methylenephosphonic acid) and 2% 2 sodium EDTA. By contrast to FIG. 2, the results shown in FIG. 3 show a much greater return permeability increase for brine than for oil.

Having described specific embodiments of the present invention, it will be understood that modifications thereof may be suggested to those skilled in the art, and it is intended to cover all such modifications as fall within the scope of the appended claims.

Having thus described the invention, we claim:

1. A method for selectively increasing the permeability of a subterranean formation penetrated by a wellbore penetrating at least one hydrocarbon-bearing zone and at least one water-bearing zone which has been treated by positioning a cross-linked polymer gel in the oil-wet zone and in the water-bearing zone, the method consisting essentially of
   a) injecting a composition consisting essentially of at least one gel inhibiting/gel breaking material selected from the group consisting of carboxylic acid containing from 1 to about 16 carbon atoms and salts thereof, at least one alcohol selected from the group consisting of alcohols containing from 1 to about 10 carbon atoms, and an oil, through the wellbore into contact with the hydrocarbon-bearing and the water-bearing zones;
   b) maintaining the composition in contact with the hydrocarbon-bearing and the water-bearing zones for a period of time sufficient for the composition to break at least a major portion of the polymer gel in the hydrocarbon-bearing zone.

2. The method of claim 1 wherein the composition is injected in an amount equal to from about 1 to about 500 percent of the pore volume in the hydrocarbon-bearing zone.

3. The method of claim 1 wherein the subterranean formation includes a plurality of hydrocarbon-bearing zones and a plurality of water-bearing zones.

4. The method of claim 1 wherein the broken polymer is produced from the oil-bearing zone with fluids from the hydrocarbon-bearing zone.

5. The method of claim 1 wherein steps a) and b) are repeated.

6. A method for selectively inhibiting the formation of a cross-linked polymer gel in a hydrocarbon-bearing zone of a subterranean formation penetrated by a wellbore and containing the hydrocarbon-bearing zone and a water-bearing zone during treatment of the subterranean formation with an aqueous polymer solution to position cross-linked polymer gel in the subterranean formation, the method consisting essentially of:
   a) injecting a composition consisting essentially of at least one gel inhibiting/gel breaking material selected from the group consisting of carboxylic acid containing from 1 to about 16 carbon atoms and salts thereof, at least one alcohol selected from the group consisting of alcohols containing from 1 to about 10 carbon atoms, and an oil, into the subterranean formation;
   b) injecting the aqueous polymer solution into the formation;
   c) maintaining the aqueous polymer solution in place for a sufficient time to permit the cross-linked polymer gel to form; and
   d) producing fluids from the subterranean formation.

7. The method of claim 6 wherein the composition is injected in an amount equal to from about 0.1 to about 90 percent of the gel volume in the hydrocarbon-bearing zone.

8. The method of claim 6 wherein a second quantity of the composition is injected after injection of the aqueous polymer solution and before step c).

9. The method of claim 8 wherein the second quantity of the composition is from about 0.1 to about 90 percent of the gel volume in the hydrocarbon-bearing zone.

10. A method for selectively inhibiting the formation of a cross-linked polymer gel in a hydrocarbon-bearing zone of a subterranean formation penetrated by a wellbore and containing the hydrocarbon-bearing zone and a water-bearing zone during treatment of the subterranean formation with an aqueous polymer solution to position cross-linked polymer gel in the subterranean formation, the method consisting essentially of:

a) injecting the aqueous polymer solution into the formation;

b) injecting a composition consisting essentially of at least one gel inhibiting/gel breaking material selected from the group consisting of carboxylic acid containing from 1 to about 16 carbon atoms and salts thereof, at least one alcohol selected from the group consisting of alcohols containing from 1 to about 10 carbon atoms, and an oil, into the subterranean formation;

c) maintaining the aqueous polymer solution in place for a sufficient time to permit the cross-linked polymer gel to form; and d) producing fluids from the subterranean formation.

11. The method of claim 10 wherein the composition is injected in an amount equal to from about 0.1 to about 90 percent of the gel volume in the hydrocarbon-bearing formation.

* * * * *